UNITED STATES PATENT OFFICE.

HENRY J. BRODERSON AND SAMUEL W. PARR, OF URBANA, ILLINOIS.

TREATING BROOM-CORN.

1,337,306.  Specification of Letters Patent.  Patented Apr. 20, 1920.

No Drawing.   Application filed July 19, 1916.   Serial No. 110,063.

*To all whom it may concern:*

Be it known that we, HENRY J. BRODERSON and SAMUEL W. PARR, both citizens of the United States, and both residing in Urbana, county of Champaign, State of Illinois, have invented certain new and useful Improvements in Treating Broom-Corn; and we do hereby declare the following to be a full, clear, and exact description of the invention, such as will enable others skilled in the art to which it appertains to make and use the same.

This invention relates to the treatment of broom corn and to the production from broom corn of low grade and undesirable appearance of a product comparable with the best grade of broom corn and available for use in the same manner as the best grade of broom corn.

Broom corn which has been permitted to mature under natural conditions is frequently discolored by a red coloration prominently distributed over the portions of the fibers commonly used for broom making. This red coloration appears in small dots or splotches or even as a continuous coloration, upon different parts of the fibers. Moreover, the intensity of the color varies considerably even with different parts of the same corn. Corn which is thus discolored, and particularly corn which is badly discolored, is considered by the trade to be of low grade and inferior value.

Attempts have heretofore been made to treat such discolored or colored broom corn in order to make from it a product of greater value. This treatment, so far as we are aware, has taken the form of dyeing the corn in order to disguise the red color, and to hide it, for example, by means of a green dye, and by treatment of the corn with sulfur dioxid. Aside from the objections incident to the use of sulfur dioxid, this treatment tends to cause an uneven appearance in the dyed corn, because of the red color of the corn before dyeing, with the result that the dye is somewhat spotted, and the red color is only slightly hidden instead of being removed.

We have now discovered that this objectionable red color can be satisfactorily dissolved away and removed, and that, moreover, the treated corn is improved in quality rather than deteriorated. Furthermore, we have found that the treatment of the corn for the removal of the red coloration can with advantage be combined with the subsequent dyeing of the corn so that the dyeing operation is promoted by the preliminary treatment, and so that a dyed corn of uniform and pleasing appearance can easily be obtained comparable in color and value with the best grade of broom corn.

The red coloration of broom corn may perhaps be due to a fungus growth, but it is more probably due to the formation of organic coloring matter such as is common to vegetation of various kinds during the autumn months or toward the close of the year. It seems to have certain of the properties of the tannates, but it has also the properties common to vegetable dyes of changing its color when treated with alkaline or acid reagents, though the color is not destroyed by such treatment.

We have discovered that this coloring matter is quite soluble in hot water. If, however, the coloring matter is simply dissolved and left in contact with the air, it rapidly oxidizes to a dark dirty color, and, if this reaction takes place in contact with the brush, it imparts the same dirty color to the fiber. The present invention, accordingly, contemplates the dissolving of this red material under conditions which will effect its removal and prevent discoloring of the brush. This dissolving, according to the present invention, is effected in the presence of agents which will prevent the discoloration, and particularly in the presence of agents which will combine with the dissolved coloring matter and precipitate it in an insoluble form, thereby removing it from the range of action.

We have found that the dissolving out of the red substance and its removal by precipitation can with advantage be carried out in a single operation. We have furthermore found that the solubility of the coloring matter is increased by the addition of certain salts such as sodium bisulfite, sodium sulfite, or other similar compounds. While these reagents may have some incidental and perhaps desirable bleaching action, their main utility is to increase the solubility of the red material and perhaps also to prevent oxidation thereof, and resulting discoloration of the brush. It is not, however, desired to bleach the brush to a white color, and accordingly the amount of the salt or salts is not such as to exert any marked bleaching action, but merely sufficient to promote the desired solubility and prevent undesirable oxidation. It is in fact desirable to leave a yellowish tinge on the brush after this treatment for the reason that a better and more natural green color can be obtained from the subsequent use of an appropriate dye.

The extraction or dissolving of the red coloring matter is effected by the use of hot water which has been heated to near the boiling point. The precipitation of the coloring matter is with advantage combined in the same operation by dissolving in the water a mordanting compound which has the property of being easily hydrolyzed so that it carries down as a precipitate any organic coloring matter which may be in the solution. As such compounds may be mentioned aluminum or chromium sulfate or other compounds of aluminum or chromium, such as the alums. Salts of copper, tin, nickel, uranium, etc., may also be used, particularly those salts which are easily hydrolyzed, forming an insoluble compound, and which serve to precipitate the organic coloring matter in an insoluble state. The solubility of the red color is further promoted by the further addition of salts of the nature above indicated i. e., sulfites or bi-sulfites. In order to prevent a too rapid hydrolysis of the compounds used, a protective colloid such as glue, casein or similar compounds may with advantage be added so that the precipitation of the coloring matter will not take place too rapidly. It is desirable that the coloring matter should be dissolved from the brush and precipitated apart therefrom, rather than be converted into an insoluble compound upon the fiber, and, accordingly, the precipitating action of the compounds used to form lakes with the dissolved dye should be restrained so that they will not convert the dye into an insoluble compound upon the fibers themselves. In the presence of such a protective colloid as that indicated, the mordanting or precipitating salts or compounds, for example, aluminum or chromium sulfate or alum, etc., are only slowly hydrolyzed, while the hydrolyzed salt nevertheless forms a lake or insoluble precipitate with the red coloring matter in solution, and the dissolved coloring matter is thus removed as a precipitate by the hydrate or basic salt resulting from the hydrolysis.

The interaction between the hot water, the red coloring matter, and the mordanting substance, is as a whole promoted by the further addition of sodium bisulfite or sulfite, or other alkali compounds of similar nature such as those of potassium or ammonium, etc., in such quantities as shall make the strength of the final solution $\frac{1}{10}$ normal as to those constituents. Such additional substances have the added advantage that they tend to destroy the remnant of the coloring matter which might be left in the brush or which has not been taken up by the hydrolyzing reaction of the mordanting media. So also, any residue of coloring matter which is not entirely dissolved and removed tends thereby to be converted into a state where its presence is not objectionable and where the residue of the coloring matter is not conspicuous.

In the practice of the invention, when, for example, aluminum sulfate is used as the mordanting or lake-forming reagent, glue as the protective colloid, and sodium bisulfite as the reagent promoting the solution and otherwise facilitating the reaction, these reagents may with advantage be used in the hot water in the proportions of .005 lb. of the aluminum sulfate and .001 lb. of glue per gallon of water, the sodium bisulfite giving the strength indicated above, namely, about $\frac{1}{10}$th normal.

Inasmuch as the coloring matter which is dissolved is converted into an insoluble condition and precipitated, it can be readily removed by passing the solution through a suitable filter, such as a sand filter, which will retain all of the deleterious precipitate. The resulting clear solution is thus recovered for further use in repeating the above process, and it is necessary to add only the necessary amounts of reagents to bring up the strength to the desired point, or to the point where the highest efficiency is secured. The process is accordingly one of marked economy involving the repeated use of the solution containing the reagents and the loss during the treatment of only such amounts of reagents as are actually consumed or as are lost incidentally during the handling of the reagents in the practice of the invention.

In actual practice, the brush is kept in contact with the hot solution for about an hour and a half to three hours. The reaction can be promoted by stirring or circulation of the liquor, or even by agitation or rubbing of the brush within the liquor, although such rubbing or agitation of the brush itself is not necessary, and any injurious rubbing or mixing should of course be avoided.

As a result of the foregoing operation, the brush is freed, or substantially freed, from its red coloration, and is thereby changed from a product of irregular and objectionable appearance to one of more uniform qualities. Moreover, the treatment above described has the additional advantage that the fiber is left in such a state that it is of particular value in the subsequent dyeing operation. The chemicals or salts used which readily hydrolyze tend to enter the texture of the fiber and to undergo a slight hydrolysis within the fiber and at its immediate surface. The fiber is thus provided with a hydroxid or basic salt, and the fiber is furthermore so modified that it receives the dye in a uniform manner.

The brush after removal from the first bath where its color is removed is dried in any suitable manner for thorough or effective drying, such as in a room or kiln containing steam coils, or any such apparatus as is used for laundry purposes. During the drying the hydrolysis of the salt contained in the fiber goes on so that at the end of the drying operation the fiber is in a particularly receptive condition for the dyeing operation. This freshly precipitated hydroxid or basic material forms a valuable mordant for receiving and holding the coloring matter. Accordingly, it will be noted that the preliminary treatment for removing the coloring matter, and in which a mordanting agent is used, prepares the fiber for the subsequent dyeing operation in which the same mordanting agent coöperates to fix and hold the dye.

The brush thus prepared is dipped into any suitable dye, such as those capable of combining with the fiber at ordinary temperatures. We have found that under these conditions such green organic substances as crystal anilin is readily taken up by the treated brush. The imparting of this dye in a uniform manner is promoted by having in the solution at the same time approximately 2% of Glauber's salts, sodium sulfate or similar material. Further, if it is desired to modify the green color of the crystal anilin, which has a slightly bluish tinge, to a green more closely approaching the natural green of the best grade brush, small amounts of yellow organic coloring matter such as auramin can be used, the amount being determined by the shade of green which is desired. The amount of the crystal anilin or other green dye is similarly determined by the shade of green which is desired. The preliminary treatment for removing the red color leaves the brush in a particularly receptive condition, as noted above, with the result that an even and uniform dyeing can be effected without any separate preliminary treatment for converting the fibers into a more receptive condition.

Whereas, according to processes of dyeing broom corn by simply imparting a stain to the fiber, a uniform and satisfactory result is often difficult to attain, by the process of the present invention, in which a mordanting agent of the type of a hydroxid is incorporated in the fiber by the preliminary treatment and the fiber thereby made especially susceptible to the dyeing operation, the uncertainty of the dyeing operation is overcome and the fiber is provided with a color or lake of uniform and pleasing appearance.

As compared with processes of treating broom corn according to which fumes of sulfur dioxid or other gases are used which may have a deleterious effect upon the workmen, the process of the present invention is one involving the use of simple solutions and harmless reagents.

The broom corn resulting from the treatment above described has incorporated within its substance both the mordanting agent resulting from the preliminary treatment and the dye subsequently combined therewith or added thereto. The product has its color evenly imparted thereto in a manner corresponding closely to the actual distribution of color in natural corn of high grade. The present invention accordingly enables corn which has become discolored from standing or from other natural agencies to be brightened and converted into a product of uniform and pleasing appearance, stimulating and comparable with the best grades of broom corn. Furthermore, as stated above, the treatment to which the brush is subjected, instead of making the material brittle or injuring the material, appears rather to have a beneficial effect, imparting to the finished product qualities which make it of enhanced value, and incorporating therein substances which exert a beneficial and preserving action thereupon.

Summarizing the foregoing description, it will be seen that the invention presents among others the following advantages and characteristics, i. e., the complete removal or the substantially complete removal of the red color from the broom corn by dissolving and precipitating and removing the red coloring matter, and in part by destroying or so changing that portion which adheres without being readily dissolved so that there is no objectionable residue; the regulation of the speed of the reactions so that the solution of the red coloring matter, as it takes place, is accompanied progressively by precipitation thereof, this regulation being effected by the use of the protective colloid; the ready removal of the precipitate formed by filtration with accompanying removal of the deleterious precipitate from further action upon the material and with recovery of the solution freed from the precipitate for further use; the dyeing of the broom corn after the preliminary treatment whereby the compounds carried in the fiber make it especially susceptible to receiving the dye, the brush becoming mordanted in part during the preliminary treatment by the depositing therein of a hydroxid or similarly acting compound, in a condition particularly valuable for receiving the dye to be added, the preliminary mordanting action being supplemented by the drying process which follows the preliminary treatment and during which a further hydrolysis takes place; and finally, by the fact that various combinations of dyes can with advantage be used, to produce the particular shade of green which is desired, and particularly the shade corresponding to the best grade of natural fiber, the dye being evenly and uniformly distributed upon and absorbed by the fiber, and this action being supplemented by the presence of Glauber's salts and the like in the dye bath.

We claim:

1. The method of treating broom corn and of effecting the removal of the red coloring matter therefrom, which comprises dissolving such coloring matter with a hot aqueous solvent under non-oxidizing conditions; substantially as described.

2. The method of treating broom corn and of effecting the removal of the red coloring matter therefrom, which comprises dissolving such coloring matter with a hot aqueous solvent containing a reagent adapted to combine with the dissolved coloring matter to form an insoluble precipitate, substantially as described.

3. The method of treating broom corn and of effecting the removal of the red coloring matter therefrom, which comprises dissolving such coloring matter with a hot aqueous solvent containing a reagent adapted to combine with the dissolved coloring matter to form an insoluble precipitate, and with a protective colloid for modifying the action of such reagent; substantially as described.

4. The method of treating broom corn and of effecting the removal of the red coloring matter therefrom, which comprises dissolving such coloring matter under non-oxidizing conditions with a hot aqueous solvent containing a reagent promoting the solution of the coloring matter; substantially as described.

5. The method of treating broom corn and of effecting the removal of the red coloring matter therefrom, which comprises dissolving such coloring matter with a hot aqueous solvent containing a reagent promoting the solution of the coloring matter, a reagent adapted to form with the dissolved coloring matter an insoluble precipitate and a protective colloid for modifying the action of said precipitating reagent; substantially as described.

6. The method of treating broom corn and of effecting the removal of the red coloring matter therefrom, which comprises dissolving such coloring matter with a hot aqueous solvent containing a sulfite constituent for promoting the solution of the coloring matter; substantially as described.

7. The method of treating broom corn and of effecting the removal of the red coloring matter therefrom, which comprises dissolving such coloring matter with a hot aqueous solvent containing a reagent for combining with the dissolved coloring matter to form an insoluble precipitate, removing the precipitate from the solution and recovering the solution freed from the precipitate for further use; substantially as described.

8. In the treatment of broom corn, the method of effecting the removal of red coloring matter therefrom, and of preliminarily mordanting the fiber, which comprises dissolving said coloring matter in a hot aqueous solvent containing a reagent adapted both to combine with the dissolved coloring matter to form an insoluble precipitate and to form within the fiber a mordanting reagent; substantially as described.

9. The method of effecting the removal of red coloring matter from broom corn and of dyeing the same, which comprises dissolving such red coloring matter in an aqueous solvent containing a reagent of a nature adapted to form a mordanting reagent for the subsequent dyeing operation, and subsequently dyeing the thus preliminarily mordanted fiber; substantially as described.

10. The method of effecting the removal of red coloring matter from broom corn and of dyeing the same, which comprises dissolving the red coloring matter in an aqueous solvent containing a reagent adapted to be hydrolyzed and absorbable by the fiber, separating the dissolved coloring matter and such solution from the fiber, drying the fiber and thereby further hydrolyzing the absorbed reagent, and finally dyeing the thus preliminarily mordanted fiber; substantially as described.

11. The method of effecting removal of the red coloring matter from broom corn and of dyeing the same which comprises dissolving such coloring matter in a hot aqueous solvent containing a mordanting reagent absorbable by the fiber, separating the fiber from such solvent and subsequently dyeing the same with a green dye in the presence of an added mordant; substantially as described.

12. The method of effecting removal of the red coloring matter from broom corn and of dyeing the same, which comprises dissolving such coloring matter in a hot aqueous solvent containing a mordanting reagent absorbable by the fiber, separating the fiber from such solvent and subsequently dyeing the same with a green dye in the presence of Glauber's salts; substantially as described.

13. The method of effecting removal of the red coloring matter from broom corn and of dyeing the same, which comprises dissolving such coloring matter in a hot aqueous solvent containing a mordanting reagent absorbable by the fiber, separating the fiber from such solvent, drying the fiber, and subsequently subjecting the thus preliminarily mordanted fiber to a dyeing operation whereby the dye is uniformly held by the preliminarily absorbed mordant; substantially as described.

14. The method of effecting the removal of red coloring matter from broom corn and of dyeing the same, which comprises absorbing such coloring matter in a hot aqueous solvent containing a reagent for promoting the solution, a reagent for combining with the dissolved coloring matter to form an insoluble precipitate, and a protective colloid for modifying the action of said precipitating reagent, removing the fiber from such solvent and from the precipitate formed, drying the fiber and subjecting the thus preliminarily treated fiber to a dyeing operation, whereby the dye is intimately combined and held by the constituents of the fiber absorbed during the preliminary treatment; substantially as described.

In testimony whereof we affix our signatures.

HENRY J. BRODERSON.
SAMUEL W. PARR.